(12) United States Patent
Seymour et al.

(10) Patent No.: US 6,411,613 B1
(45) Date of Patent: Jun. 25, 2002

(54) METHOD FOR FORMATTING AND CONVEYING INFORMATION IN A WIRELESS TELECOMMUNICATION SYSTEM

(75) Inventors: James Paul Seymour, Lake Hiawatha; Andrea M. Tonello, Bridgewater, both of NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/133,052

(22) Filed: Aug. 12, 1998

(51) Int. Cl.[7] .............................................. H04B 7/212

(52) U.S. Cl. ...................................... 370/347; 370/474

(58) Field of Search ................................ 370/321, 329, 370/330, 336, 345, 347, 348, 349, 431, 436, 437, 442, 458, 468, 470, 498

(56) References Cited

U.S. PATENT DOCUMENTS

| | | | | |
|---|---|---|---|---|
| 5,335,228 A | | 8/1994 | Bottiglieri et al. | 370/100.1 |
| 5,400,362 A | | 3/1995 | Chennakeshu et al. | 375/58 |
| 5,471,501 A | * | 11/1995 | Parr et al. | 375/354 |
| 5,535,207 A | * | 7/1996 | Dupont | 370/433 |
| 5,742,612 A | * | 4/1998 | Gourgue et al. | 714/701 |
| 5,751,731 A | * | 5/1998 | Raith | 714/752 |
| 5,818,829 A | * | 10/1998 | Raith et al. | 370/347 |

OTHER PUBLICATIONS

Keiser et al., Digital Telephony & Network Integration, 1995, PP:237–244.*

* cited by examiner

*Primary Examiner*—David Vincent
(74) *Attorney, Agent, or Firm*—Law Office of John Ligon

(57) ABSTRACT

A method for conveying information in a new format structure for a wireless communication system in which users convey information on a time slot basis. The new format structure is made compatible with the system's existing format by partitioning system time slots into sub-slots.

15 Claims, 5 Drawing Sheets

METHOD FOR FORMATTING AND CONVEYING INFORMATION IN A WIRELESS TELECOMMUNICATION SYSTEM

BACKGROUND OF THE INVENTION

1. Field of the Invention

The present invention is directed to Time Division Multiple Access (TDMA) telecommunication systems and more particularly to a method of conveying information in such systems where the information is arranged in a new format.

2. Description of the Related Art

Wireless telecommunication systems use various schemes to allow multiple users to use (i.e., share simultaneously) a particular bandwidth. The bandwidth is part of or all of the band of frequencies allocated to the telecommunication system for conveying (i.e., transmitting and receiving) information. The information includes user information (e.g., voice) and signaling information. The signaling information are data generated by various equipment of the telecommunication system that are used by the telecommunication system to manage, process and convey the user information. One multiple access scheme that is widely used in many wireless telecommunication systems is called Time Division Multiple Access.

A TDMA wireless telecommunication system allows multiple users to use the same bandwidth by creating time frames (hereinafter "frames") comprising time slots (hereinafter "slots") within which each user is allowed to convey their information. Signaling information is also conveyed during each slot. Each slot or a group of slots are defined and are assigned to a particular user. Thus, each user is allowed to transmit and/or receive information in that user's assigned slot. In this manner, many users are able to use the same bandwidth thus increasing the user and/or information capacity of the system.

FIG. 1 depicts a typical scenario in a TDMA system where user 1 is conversing with user 2. For the sake of clarity, only two users are shown. In an actual system, there is usually more than one base station and many more users throughout the system some of whom obtain access to base station 106 via a wireline telephony network such as the Public Switched Telephone Network (PSTN). The users have mobile equipment 100 and 112 (e.g., cellular phone) which they use to communicate with each other. Base station 106 represents part of the TDMA system's equipment which relays the user information in accordance with the signaling information and protocol used by the system. The protocol is a particular set of rules by which the system equipment and the user equipment initiate communication, convey information and terminate communication. Typically, protocols are established communication standards that are well defined and which are followed by many wireless telecommunication systems. Wireless communication channels 102 and 110 are commonly referred to as the uplink, which is the channel used by the users to transmit information to base station 106. Communication channels 104 and 108 are commonly referred to as the downlink, which is the channel used by the users to receive information from base station 106. The information (user and signaling) is conveyed over the uplink and downlink in the form of Radio Frequency (RF) signals.

FIG. 2 depicts a particular frame format and a slot format used by a protocol referred to as the IS-136 standard. The IS-136 standard is a protocol used by many TDMA wireless telecommunication systems in North America and South America. The frame format is the particular arrangement of the slots within frame 200 and the slot format the arrangement of user information and signaling information within each slot. In particular, frame 200 has a time duration of 40 milliseconds and is divided equally into six slots. IS-136 allocates 30 KHz of bandwidth per carrier. The information rate (i.e., symbol rate) is 24.3 K symbols/sec. Each slot has a time duration of 6.67 milliseconds and comprises 324 bits. Although the frame format (i.e., six slots per frame) is the same for the uplink and the downlink, the slot formats are different. Slot 202 depicts the uplink slot format and slot 204 depicts the downlink slot format. Slots 202 and 204 each are divided into fields which are portions of the slot reserved for either user information or signaling information. For example, slot 204 has fields 206 and 208 labeled DATA each of which reserves 130 bits for user information. Field 210 of slot 204 has 28 bits reserved for signaling information referred to as SYNC. The significance of the different fields of signaling information of slots 202 and 204 is defined in the IS-136 standard, TIA/EIA IS-136.1, 136.2 which is incorporated herein by reference.

Still referring to FIG. 2, for downlink slot 204, the first 28 bits of information transmitted and received (i.e., conveyed) are the SYNC bits. The next 12 bits transmitted and received are signaling bits called Slow Associated Control Channel (SACCH) bits followed by 130 bits of DATA. The remainder of the information is transmitted in the order shown. The uplink information is transmitted and received in the order shown by slot 202 of FIG. 2.

In IS-136, a maximum of either three (3) users or six (6) users are allowed to convey information within the frame and slot format discussed above. The number of users per frame depends on the mode at which the TDMA system is operating. In IS-136 compliant systems there are two modes of operation. The first mode of operation is referred to as the Full Rate mode in which each user is assigned two slots per frame. The second mode of operation is called the Half Rate mode in which each user is assigned one slot per frame. Thus, there can be up to six users per frame in the Half Rate mode and up to three users per frame in the Full Rate mode or a combination of both modes can be used in one system.

FIG. 3 depicts a user allocation scheme used in IS-136 Full Rate mode (Frame 300) and Half Rate mode (Frame 302) for the uplink and the downlink. In the Full Rate mode, user 1 is assigned to slots 1 and 4, user 2 is assigned to slots 2 and 5 and user 3 is assigned to slots 3 and 6. In the uplink and downlink slot formats, the SYNC fields are used to allow the user information (i.e., DATA) to align and synchronize a user's information to the proper slot. Thus, the SYNC fields assist the system to delineate the slots. Each SYNC field has a bit pattern unique to the slot within which it is located.

Prior to being transmitted over a wireless communication channel, the user and signaling information are processed to attenuate adverse effects on the information caused by channel noise and other channel distortions. In particular, the RF signals, which carry the user and signaling information, are exposed to various well known distorting effects such as phase jitter, frequency offset, amplitude and phase fading and multipath distortions.

TDMA signals, especially uplink signals, are by nature bursty signals; that is the signals for any particular user are transmitted and received as short intermittent bursts each of which carries a great deal of information. When a transmitted or a received burst of information is adversely affected by channel distortions, a great amount of the information is lost. Therefore, to reduce the likelihood of losing large amounts of information, a certain amount of processing of the information is done prior to transmission. The intent of the processing is twofold; first it is to introduce redundancy to the information with the use of well known channel coding techniques. Channel coding protects information from errors by selectively introducing redundancies in the conveyed information. The second intent of the processing is to add time diversity to the information by spreading out in time the burst of information using the well known technique of interleaving. Interleaving is used to obtain time diversity in a communication system. Since channel coding techniques are designed to protect against channel errors that occur randomly or in a bursty manner, interleavers scramble the time order of the information to achieve time diversity and improve the performance of the coding scheme.

Referring to FIG. 1A, there is shown some of the processing performed on a voice signal by equipment such as base station 106 and mobile equipment 100 and 112 for a TDMA system that complies with the IS-136 standard. A speech signal is digitized (not shown) and is fed to vocoder 140. Vocoder 140 is an Algebraic Code Excited Linear Predictive (ACELP) system that represents speech signals as a mathematical model comprising various parameters. The speech is essentially converted to a group of parameters. Vocoder 140 complies with IS-641 which is a standard for ACELP vocoders. The output of vocoder 140 is fed to channel coder 142. Channel coder 142 allows the system to determine whether information transmitted over a communication channel contains errors; the channel coders also provide techniques to correct the detected errors by introducing repetitions to the vocoder output signal. Channel coder 142 thus adds error detection codes and error correction codes to the voice parameters produced by vocoder 140. The output of channel coder 142 is fed to data encryption device 144 which provides user privacy by encrypting the coded mathematical parameters. The output of encryption device 144 is fed to 2-slot interleaver 146 which spreads out a burst of information over two nonconsecutive slots. The output of interleaver 146 is fed to modulator 148. Modulator 148 converts every two bits of the interleaved coded and encrypted mathematical parameters to one symbol. The symbols are transmitted over the communication channels (uplinks 102, 110 and downlinks 104 and 108) in the form of RF signals by radio equipment (not shown).

Referring to FIG. 4, there is shown the 2-interslot interleaving process done for an IS-136 compliant TDMA system in the Full Rate mode. Two storage devices are used to store information for transmission. Storage device 402 is divided into two buffers (buffer 402A and buffer 402B) each of which has a capacity of 10 milliseconds worth of information. At the beginning of slot 1 (i.e., at time t1) buffer 402A is filled with 10 milliseconds worth of information and buffer 402B is also filled with 10 milliseconds worth of information. Storage device 404 is empty. During the occurrence of slot 1, the 10 millisecond of information in buffer 402A is transmitted. Between time t1 and t2 bufffer 404A is filled with 10 milliseconds worth of information and buffer 404 B is also filled with 10 milliseconds worth of information. A time t2, the contents of buffer 404A and 402B are transmitted. The process is repeated starting with slot 1 of the next frame (not shown) resulting in 20 milliseconds worth of information being transmitted every 20 milliseconds. It should be noted that at the beginning of the process, only 10 milliseconds worth of information was transmitted. Also, it should be noted that at time t3 storage device 402 is empty and thus can be used again as it was used during the occurrence of slot 1 of the frame shown. The length of transmission for slot 1 or slot 4 is 6.67 milliseconds. There is an inherent delay associated with the interleaving process. The delay associated with the transmission of the contents of storage device 402 is 46.67 milliseconds (20 msec+20 msec.+6.67 msec.). The delay is defined as the maximum time that can elapse from the time of initially storing information in a storage device to the time the storage device becomes empty. The same process is followed by user 2 during slots 2 and 5 and user 3 during slots 3 and 6. It is in this manner that information of each user is spread out over two slots. For the half rate mode 2-interslot interleaving cannot be done within a single frame because only one slot is assigned per user during a frame. It should be noted that each buffer of storage device 402 as well as device 404 contain information that represents 20 milliseconds of speech which is transmitted within a time period of 6.67 msec. (length of a slot) because the speech is efficiently represented as mathematical parameters created by a vocoder.

The increasing use and popularity of wireless telecommunication systems mandate that such systems increase their user capacity. Due to improvements in communication technology equipment, more efficient vocoders, channel coders and modulators are being developed allowing system providers to transmit even more information in each slot. For example, modulators in the very near future should be able to compress three bits into one symbol. However, with the increased capacity comes a higher susceptibility to channel distortions. A user can lose a great amount of information due to channel distortions that affect an entire slot regardless of the channel coding technique used. A combination of different processing technique is needed to more effectively combat channel distortions. The use of combined processing techniques (e.g., channel coding combined with interleaving) many times depends on the format being followed by a system. For example, in IS-136 systems operating in the Half Rate mode, interslot interleaving is not possible because each user is assigned only one slot per frame. Therefore there exists a need to devise an information format that allows for the use of different processing techniques that can effectively attenuate the adverse effects of communication channel distortions.

SUMMARY OF THE INVENTION

The present invention provides a method for conveying information in a TDMA telecommunication system in which each user transmits and receives information during assigned system time slots within a time frame in accordance with a system format. The present invention describes a new format for conveying user and signaling information that improves the information and user capacity of the wireless communication system. The new format further allows more effective processing (e.g. inter-slot interleaving) to be used for protecting the conveyed information from channel distortions. In addition the new format is compatible with most features that can be implemented in current systems (e.g., all features in IS-136 compliant systems).

First, each time slot within each time frame is partitioned into a plurality of subslots and a subslot delineater field is created for each subslot where the plurality of subslots is time aligned with the system time slots. Each user is assigned to at least one subslot. Because the plurality of the subslots taken as a whole is aligned with the system time slots, the system has the flexibility of conveying information in accordance with the new format or current system formats.

DETAILED DESCRIPTION

Figure 5:
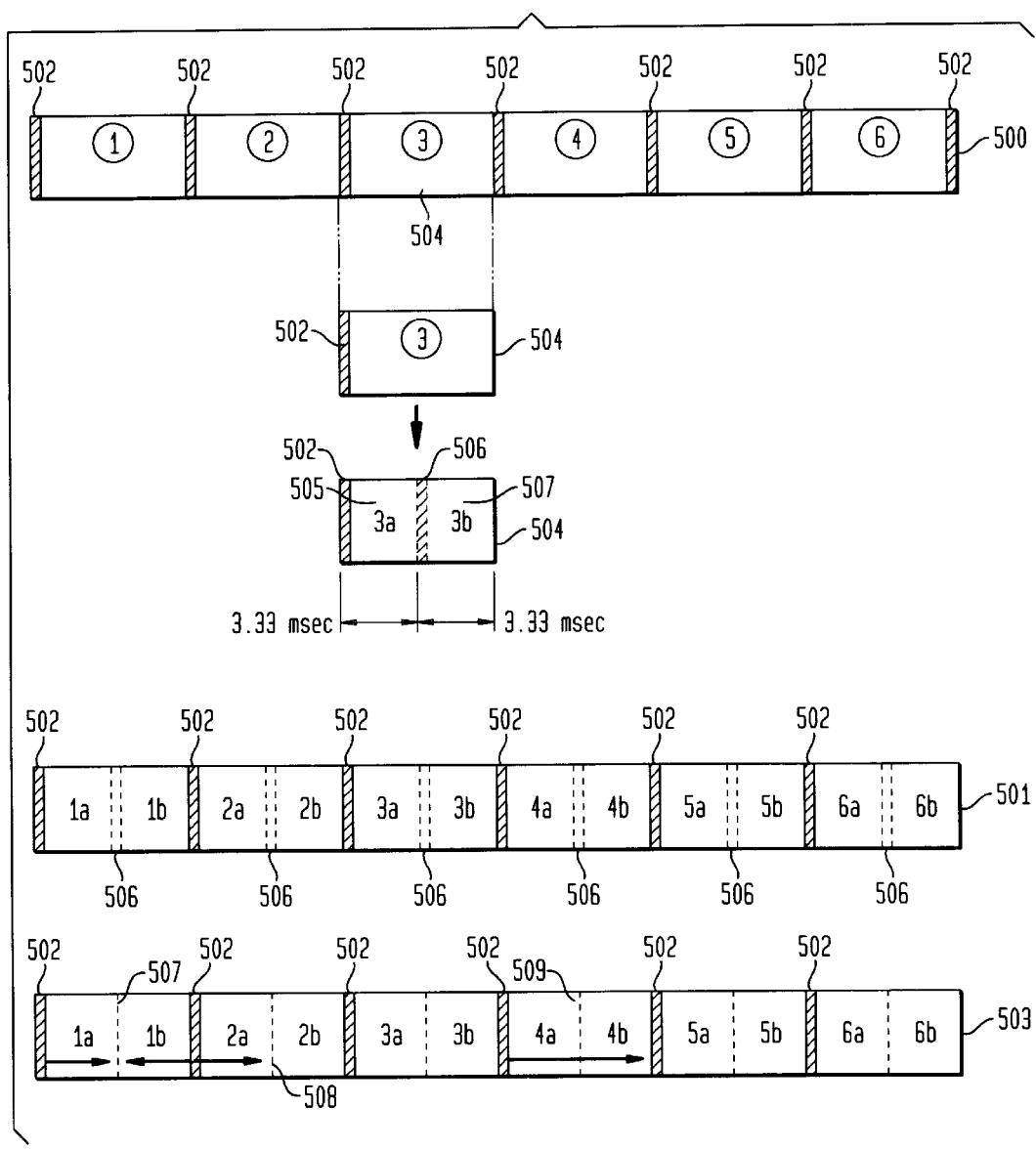
FIG. 5 depicts the method of the present invention in which an IS-136 frame is converted to a frame with a new format.

Referring to FIG. 5, there is shown the frame format resulting from the method of the present invention. For the purposes of clarity, the frame format resulting from the method of the present invention will be described within the context of an IS-136 compliant TDMA wireless telecommunication system. The method of the present invention is applicable to other types of TDMA systems and to other communication systems (wireless or wireline systems) that allow users to convey information on a time slot basis.

For ease of understanding the method of the present invention is discussed in the context of a frame for an IS-136 compliant TDMA system. In accordance with the IS-136 standard, frame 500 originally has six time slots with a sync field (502) assigned to each time slot. The third time slot (i.e., slot 504) is expanded to more clearly illustrate the operation of the method of the present invention. Slot 504 is partitioned into subslot 505 and subslot 507. Subslot delineater field 506 is created to assist the system in delineating the subslots from each other in the same manner the SYNC fields were used. In the context of an IS-136 system subslot delineater field 506 is used in the same manner as a SYNC field. Thus the subslot delineater fields are used by the system to mark or indicate the location at which the original system slots are partitioned. Each of the subslots is 3.62 milliseconds in length. It should be noted that the method of the present invention is not limited to partitioning each slot into two slots. Indeed, as communication technology improves, it becomes feasible for example to partition each slot into three, four or more subslots. Because the subslots are partitions of the original slots, the new format can always be collapsed back to the original format. Thus, regardless of the number of partitions per slot, the resulting new format remains compatible with the original system format. SYNC field 506 is assigned to subslot 507 and SYNC field 502 is assigned to subslot 505.

The resulting new frame format is represented by frame 501. Frame 501 has 12 subslots and is referred to as a TDMA12 frame. The subslots can be allocated in several ways. For example, the system can allocate a subslot for each user resulting in 12 users per frame. Alternatively, the system can assign two slots per user resulting in a frame format that is similar to the Half Rate format for an IS-136 compliant system in the sense that up to six users are allocated per frame. However, a TDMA12 frame for which two slots are assigned per user allows the system to perform interslot in a single frame interleaving unlike a frame that complies with the IS-136 Half Rate mode. It should be noted, however, that interslot interleaving can be achieved within more than one frame. The system can assign four slots per user resulting in a user allocation structure that is similar to an IS-136 compliant system operating in the Full Rate mode in the sense that up to three users are allocated per frame. The method of the present invention also includes slot allocation schemes in which some users are assigned to one slot and other users (within the same frame) are assigned to more than one slot. The slot allocation schemes discussed above and other possible slot allocation schemes for the TDMA12 format apply to uplink and downlink frames.

Figure 1:
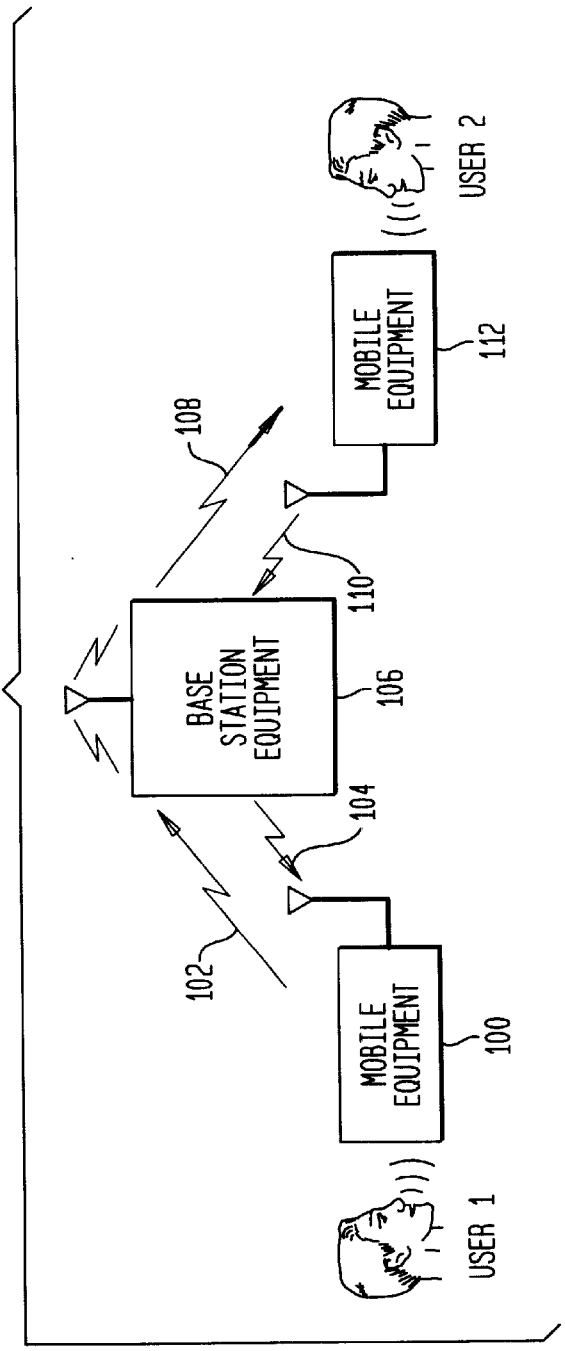
FIG. 1 depicts a portion of a wireless communication system.
Figure 1A:
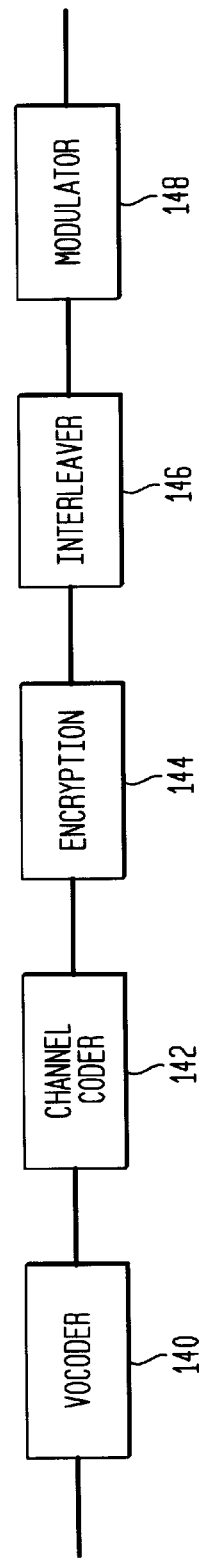
FIG. 1A depicts information processing equipment used in a wireless communication system.
Figure 2:
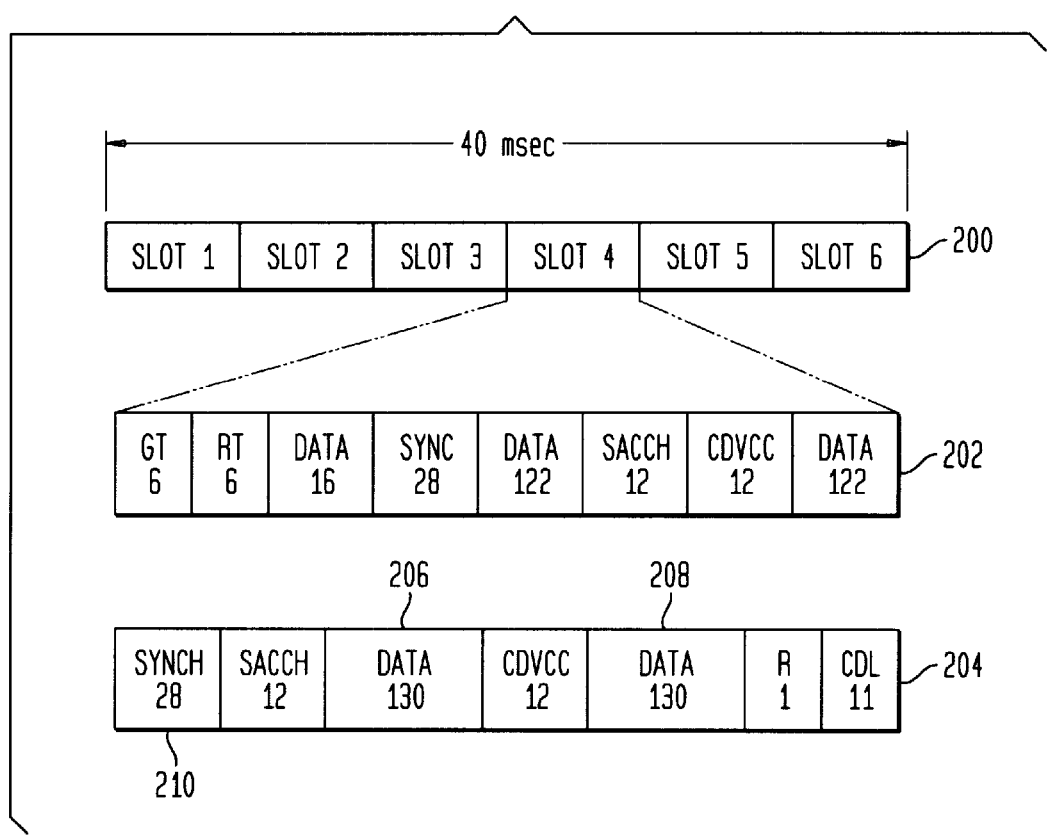
FIG. 2 depicts the frame format and slot format for a TDMA system that complies with the IS-136 standard.
Figure 3:
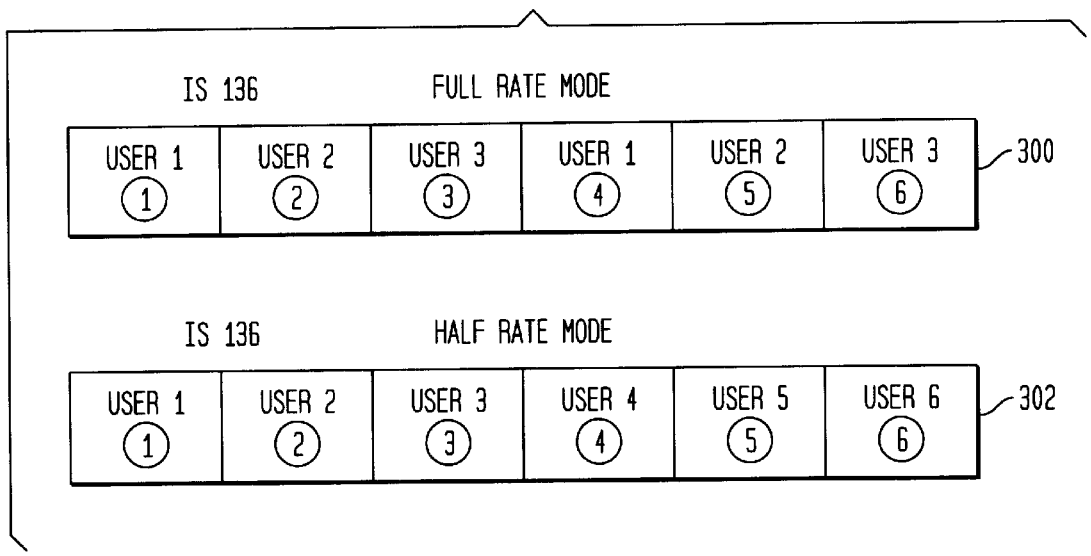
FIG. 3 depicts the frame format for an IS-136 system in the Full Rate mode and the Half Rate mode.
Figure 4:
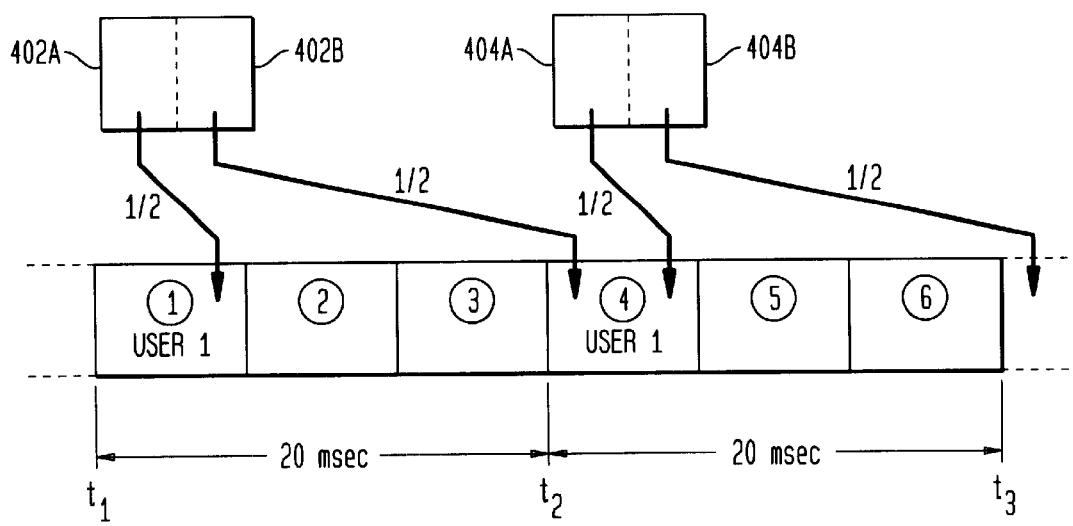
FIG. 4 illustrates the technique of 2-slot interleaving for a frame operating in the Full Rate mode.

The TDMA12 format structure (downlink and uplink) allows the system to convey more information and have more users when compared to the frame format for the IS-136 standard. The TDMA12 format (downlink and uplink) can be made even more efficient by reducing the length of the SYNC fields (506, 502)—e.g., SYNC fields less than 14 symbols (see FIG. 2). In current IS-136 systems, each symbol represents 2 bits of information. The method of the present invention does not preclude circumstances in which the SYNC fields are lengthened, i.e., SYNC fields of more than 14 symbols. In addition, the TDMA downlink format can be made more efficient by removing some of the SYNC fields to make more space available for user information. One possible scheme is to eliminate the newly created SYNC fields (506) and use only the original SYNC fields (502). The resulting TDMA12 downlink format is depicted by frame 503 of FIG. 5.

Frame 503 of FIG. 5 depicts a TDMA12 format referred to as sync co-shared. Referring to subslots 1a and 1b, the subslot delineater field (502) (i.e., the SYNC field) between subslots 1b and 2a is shared by these two slots to determine partitions 507 and 508. The length of each subslot is calculated in the following manner: first the length of the original frame (i.e., 40 msec. in IS-136 systems) excluding the SYNC fields is divided by 12; the length of a SYNC field is added to the result yielding the length of each subslot. One possible way of implementing the sync co-shared format is to store the information conveyed in the subslots and detect the location of the SYNC fields. When a SYNC fields is detected, the system can count the number of symbols (i.e., units of information) to determine the location of partitions (e.g., 507, 508). It should readily be understood by those skilled in the art to which this invention belongs that the system can count backwards from a detected sync field or count forward from a detected sync field to determine the partitions.

Regardless of the frame format (TDMA12 or TDMA12 sync co-shared) that results from the method of the present invention, each subslot contains user information and signaling information for one user. The processing and manipulation of a subslot directly affects only the user to which that slot is assigned; that is to say that the entire information conveyed within one slot is for one user. However, TDMA12 and TDMA12 sync co-shared downlink formats also allow for the intermingling of users in a slot or subslot. Intermingling of information is the mixing of information from different users and placing this mixed information into one subslot. Referring again to FIG. 5 and in particular to subslots 4a and 4b which are delineated by partition 509. Information for different users can be co-shared in slots 4a and 4b. In such a situation, the system uses the original sync fields to delineate the boundaries of the co-shared subslots. The information stored in co-shared slots 4a and 4b can be intermingled, or apportioned in any arbitrary manner by the system. The technique of co-sharing and how the information is arranged in the co-shared slots is another way of increasing time diversity of the information within a frame.

When intermingling is not used several advantages result in the system's ability to process information. First, the process of encryption of data is more effective because each user is able to preserve the privacy obtained from encrypting their information. When information of different users are intermingled within one subslot, those users are attached to the same encryption scheme and thus have no privacy with respect to each other. Second, the system uses certain fields within a subslot to control the power level of each user's information. Intermingling of information will eliminate the individual control of the power level of the information for each of the users. For example, one of the intermingled users may need its power level increased while another intermingled user has to have its power level decreased. The conflicting requirements of the different intermingled users cannot be met in such a scenario. Third, various vocoders called Adaptive MultiRate (AMR) vocoders allow the system to vary the vocoders information rate based on system dynamics such as information error rate, system bandwidth, frame format (Half Rate or Full Rate), and the system's frequency of operation. The AMR vocoder thus does not necessarily output information at a constant rate. In some cases the vocoder may output information at a higher or lower rate—i.e., higher or lower than the rate defined for the system by the standard which is being followed by the system. The system takes advantage of this varying information rate by adjusting the amount of channel coding it applies to each user. For example, a user which is outputting information (via its AMR vocoder) at a lower bit rate is able to use more intense channel coding schemes that use more bits to pad the information resulting in a more robust (better able to withstand noise) information.

Figure 6:
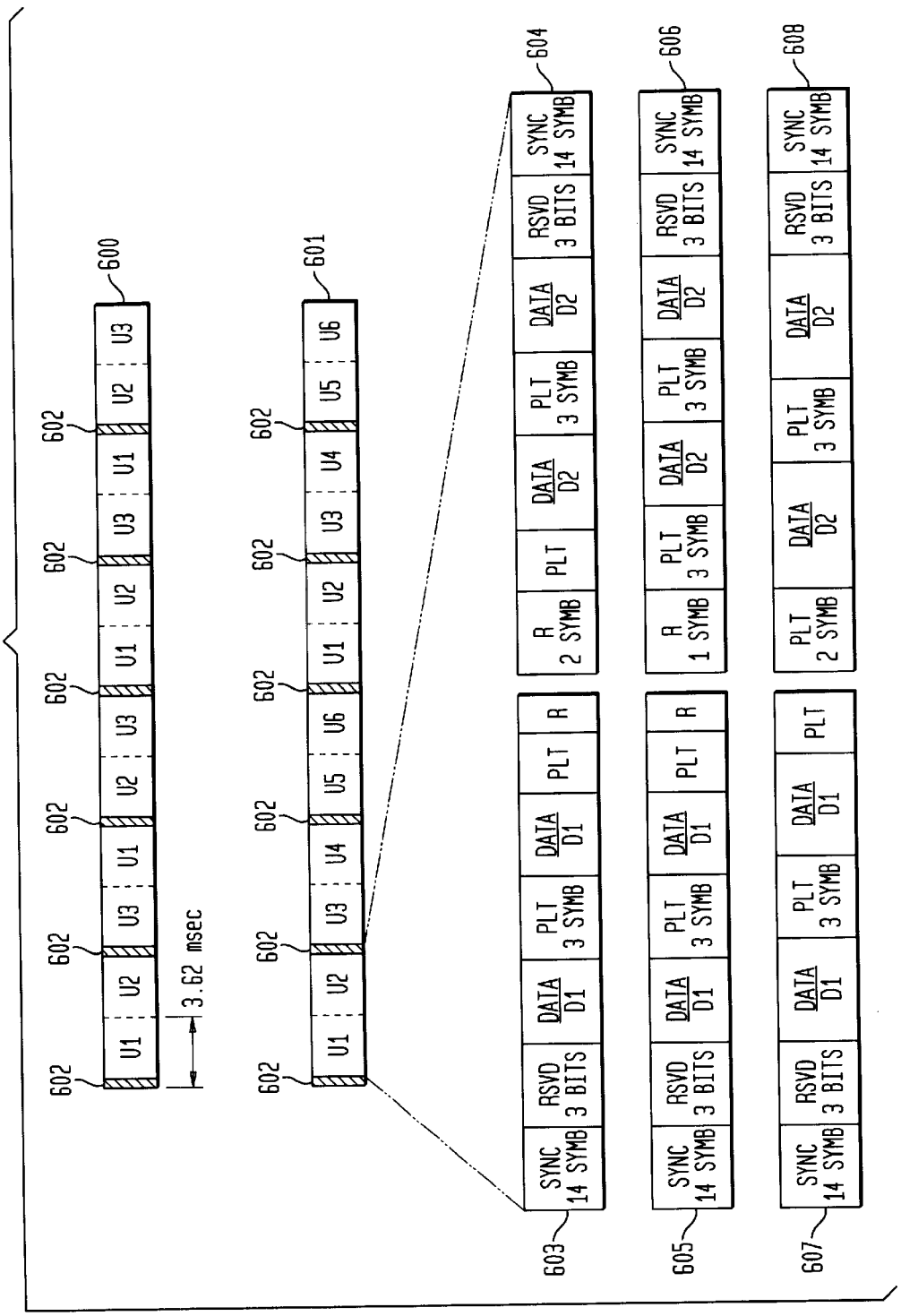
FIG. 6 depicts frame formats and slot formats constructed in accordance with the method of the present invention.

Referring to FIG. 6 there is shown the TDMA12 sync co-shared downlink frame formats for an IS-136 system operating in the Full Rate mode (Frame 600) and the Half Rate mode (Frame 601). Accordingly, each frame has six SYNC fields (602). In both modes of operation, interleaving of information between subslots can be implemented to attenuate the adverse effects of channel distortions. For example, for frame 600, the information conveyed by each user can be spread among four subslots. For frame 601 information for each user is spread among two subslots. Subslots 603–608 depict various downlink TDMA12 sync co-shared subslot configurations. The subslots 603–608 present all fields (signaling information fields and user information fields) that are necessary to allow compliance and compatibility with IS-136. The SYNC fields contain 14 symbols where each symbol represents a plurality of bits (e.g., 2 bits/symbol for IS-136). The subslot configurations represent the actual order in which the information within each subslot is conveyed (transmitted and received) over the system. For example, in subslot 603, the 14 sync symbols are first conveyed, then the 3 reserved bits (which can be used for power control) are conveyed followed by Data bits (user information) followed by 3 pilot symbols (PLT) signaling information which is followed by another block of Data bits and so on. R represents signaling information used for allowing time for power level adjustments. The particular order of information conveyance for the other subslots is obtained in the same manner.

Some of the signaling information (e.g., SYNC, PLT) within each subslot is used to estimate the adverse affects due to channel distortions and apply processing to overcome these adverse affects; this technique is commonly referred to as channel estimation. The most appropriate processing encompasses all of the processing techniques discussed above and other well known techniques used to combat the adverse effects of channel distortions in communication systems. Recall that the process of dividing the original frame into a plurality of subslots leads to subslots with relatively short time durations; this allows for more effective channel estimation techniques. The particular channel estimation technique that is being used is made more effective because channel conditions will not vary as much over shorter time intervals so that channel conditions are easier to estimate.

We claim:

1. A method for conveying information in a TDMA wireless telecommunication system in which users of the system transmit and receive information during assigned system time slots within a time frame in accordance with a system format, the method comprising the steps of:

partitioning each system time slot into a plurality of equal-length subslots;

creating subslot delimiter fields to indicate partitioning locations, the delimiter fields being independent of information fields in the subslots;

wherein contiguous subslots within a given slot accept assignment of, and maintain independent processing for user information of independent users.

2. The method of claim 1 wherein each subslot is specified in respect to a defined delimiter.

3. The method of claim 2 wherein each subslot is defined in respect to a sync field beginning the subslot.

4. The method of claim 2 wherein each subslot is defined in respect to a sync field beginning each slot and an algorithm determining subslots relative to the sync field.

5. The method of claim 1 wherein user assignments to subslots are arranged to permit interslot interleaving for IS-136 systems operating in Half Rate mode.

6. The method of claim 1 wherein each subslot contains data and signaling information for a single user.

7. The method of claim 6 wherein each subslot further contains a power control field.

8. The method of claim 1 wherein subslots are arranged to provide improved channel estimation.

9. A method for transmitting data from multiple users over a channel in a transmission medium, where information to be transmitted is packaged into fixed length frames, the method comprising the steps of:

organizing a frame into a plurality of slots according to a known methodology;

partitioning each slot into a plurality of equal-length subslots, each said subslot being specified in respect to a defined delimiter field, the delimiter fields being independent of information fields in the subslots;

wherein adjacent subslots of a given slot accept assignment of, and maintain independent processing for user information of independent users.

10. The method of claim 9 wherein each subslot is defined in respect to a sync field beginning the subslot.

11. The method of claim 9 wherein each subslot is defined in respect to a sync field beginning a slot and an algorithm determining subslots relative to the sync field.

12. The method of claim 9 wherein user assignments to subslots are arranged to permit interslot interleaving for IS-136 systems operating in Half Rate mode.

13. The method of claim 9 wherein each subslot contains data and signaling information for a single user.

14. The method of claim 13 wherein each subslot further contains a power control field.

15. The method of claim 9 wherein subslots are arranged to provide improved channel estimation.

* * * * *